United States Patent [19]

Michels et al.

[11] Patent Number: 5,247,008

[45] Date of Patent: Sep. 21, 1993

[54] FLUORINE CONTAINING COPOLYMERS AND AQUEOUS DISPERSIONS PREPARED THEREFROM

[75] Inventors: Gisbert Michels, Cologne; Hans-Albert Ehlert, Leverkusen, both of Fed. Rep. of Germany

[73] Assignee: Bayer Aktiengesellschaft, Leverkusen, Fed. Rep. of Germany

[21] Appl. No.: 4,348

[22] Filed: Jan. 14, 1993

[30] Foreign Application Priority Data

Jan. 22, 1992 [DE] Fed. Rep. of Germany ....... 4201604

[51] Int. Cl.$^5$ .................. C08L 27/12; C08F 18/20
[52] U.S. Cl. ................... 524/544; 526/243; 526/245
[58] Field of Search ............. 526/243, 245; 524/544

[56] References Cited

U.S. PATENT DOCUMENTS

| | | | |
|---|---|---|---|
| 4,127,711 | 11/1978 | Lore et al. | 526/243 |
| 4,366,299 | 12/1982 | Dessaint | 526/243 |
| 4,564,561 | 1/1986 | Lore et al. | 428/422 |
| 4,579,924 | 4/1986 | Schwartz et al. | 526/243 |
| 4,781,844 | 11/1988 | Kortmann et al. | |

FOREIGN PATENT DOCUMENTS 1454906  11/1976  United Kingdom ............. 526/245

*Primary Examiner*—Joseph L. Schofer
*Assistant Examiner*—N. Sarofim
*Attorney, Agent, or Firm*—Sprung Horn Kramer & Woods

[57] ABSTRACT

Finishing agents for textiles, leather, paper and mineral substrates of the type mentioned in the title and the aqueous dispersions prepared therefrom are characterized by the following percentages by weight of the comonomers, relative to the total weight of the copolymers:

a) 45-75% by weight of (meth)acrylates containing perfluoroalkyl groups, of the formula $$C_nF_{2n+1}-X-OCO-CR^1=CH_2 \qquad (I)$$

b) 10-50% of monomers of the formulae $$CH_2=CH-CO-OR^4 \qquad (IIa)$$

and/or $$CH_2=C(CH_3)-CO-OR^{12} \qquad (IIb)$$

c) 4-30% of monomers of the formula $$CH_2=CR^5-COO-(CH-CH_2O)_{\overline{p}}R^7 \text{ and} \qquad (III)$$
$$\phantom{CH_2=CR^5-COO-(}|\phantom{CH-CH_2O)_{\overline{p}}R^7}$$
$$\phantom{CH_2=CR^5-COO-(}R^6$$

d) 1-15% of monomers of the formula $$CH_2=CR^{11}-COO-CH_2CH_2-N(R^8, R^9) \text{ or} \qquad (IVa)$$

$$[CH_2=CR^{11}-COO-CH_2CH_2-N(R^8, R^9, R^{10})]^{\oplus}Y^{\ominus} \text{ or} \qquad (IVb)$$

$$CH_2=CR^{11}-COO-CH_2CH_2-N(R^8, R^9). \qquad (IVc)$$
$$\phantom{CH_2=CR^{11}-COO-CH_2CH_2-N(R^8, R^9).}\downarrow$$
$$\phantom{CH_2=CR^{11}-COO-CH_2CH_2-N(R^8, R^9).}O$$

The monomers in b) can be replaced completely or partially by monomers from the group consisting of styrene, acrylonitrile, vinyl acetate, vinyl propionate and methyl methacrylate. The substituents have the meaning given in the description.

9 Claims, No Drawings

FLUORINE CONTAINING COPOLYMERS AND AQUEOUS DISPERSIONS PREPARED THEREFROM

BACKGROUND OF THE INVENTION

1. Field of the Invention

The invention relates to copolymers of monomers containing perfluoroalkyl groups, hydrophilic, ionic and non-ionic monomers and also other comonomers. The invention furthermore relates to the preparation of the copolymers and aqueous dispersions of these copolymers and their use for the finishing of textile materials, leather, paper and mineral substrates against the effects of oil, dirt and water.

2. Description of the Related Art

It is known from U.S. Pat. No. 4,127,711, U.S. Pat. No. 4,564,561, U.S. Pat. No. 4,366,299 and U.S. Pat. No. 4,579,924 that copolymers can be prepared from monomers containing perfluoroalkyl groups, hydrophilic, ionic or non-ionic monomers, and if desired, other comonomers.

The disadvantage is that either the dispersions prepared from these copolymers contain solvents which, during application, make specific safety measures necessary because of the relatively low flash point, or the preparation of the dispersions is possible only with the aid of emulsifiers which, on the other hand, in turn decrease the desired effects, or that, in order to guarantee a high oil- and water-repellency, a very high fluorine content is necessary, which on the other hand leads to hardening in the substrates finished therewith. A further disadvantage is the fact that, after finishing with copolymers from the prior art containing perfluroalkyl groups, a thermal aftertreatment compulsorily has to take place in order to guarantee a high oil- and water-repellency. It is admittedly known from U.S. Pat. No. 4,127,711 that a thermal aftertreatment can also take place under relatively mild conditions of 80° C., but this condition is also disadvantageous for certain applications.

SUMMARY OF THE INVENTION

The invention is therefore based on the object of developing highly effective oil and water repellent finishing agents for textiles, leather, paper and mineral substrates which can be prepared as an aqueous dispersion without the use of emulsifiers, which furthermore have a lower fluorine content than conventional finishing agents and which can be employed to obtain a high oil- and water-repellency without thermal aftertreatment.

It has now surprisingly been found that copolymers consisting of monomers containing perfluoroalkyl groups, hydrophilic, ionic and hydrophilic, non-ionic monomers and also other monomers, are suitable for the production of aqueous dispersions for the oil and water repellent finishing of textiles, leather, paper and mineral substrates without a very high fluorine content being necessary, without emulsifiers having to be employed for the production of dispersions from these copolymers and without a thermal aftertreatment having to take place.

Furthermore, the dispersions prepared from the copolymers are also stable when the solvent content is so low that flash points above 100° C. result.

The invention therefore relates to fluorine-containing copolymers and aqueous dispersions prepared therefrom containing 5 to 50% by weight, preferably 10 to 40% by weight relative to the total weight of the dispersions, of ingredients other than water (solids content), which are characterised in that the copolymers contain copolymerised comonomers in the following percentages by weight, relative to the total weight of the copolymers:

a) 45-75% by weight of (meth)acrylates containing perfluoroalkyl groups, of the formula $$C_nF_{2n+1}-X-OCO-CR^1=CH_2 \qquad (I)$$

in which n represents a number from 4-12, preferably 6-10,
$R^1$ denotes hydrogen or methyl and
X represents $-(-CH_2-)_m-$, $-SO_2-NR^2-CH_2-CHR^3$ or $-O-(-CH_2-)_m-$, where m denotes a number from 1 or 4, $R^2$ represents $C_1-C_4$-alkyl and $R^3$ represents hydrogen or methyl, b) 10 to 50% of monomers of the formulae $$CH_2=CH-CO-OR^4 \qquad (IIa)$$

and/or $$CH_2=C(CH_3)-CO-OR^{12} \qquad (IIb),$$

in which
$R^4$ represents a $C_1-C_{22}$-alkyl radical and
$R^{12}$ denotes $C_2-C_{22}$-alkyl, c) 4 to 30% of monomers of the formula $$CH_2=CR^5-COO+CH-CH_2O+_pR^7 \qquad (III)$$
$$\phantom{CH_2=CR^5-COO+C}|$$
$$\phantom{CH_2=CR^5-COO+}R^6$$

in which
$R^5$ and $R^6$ independently represent hydrogen or methyl
$R^7$ denotes hydrogen or $C_1-C_8$-alkyl and
p represents a number from 1 to 50, and d) 1 to 15% of monomers of the formula $$CH_2=CR^{11}COOCH_2CH_2N(R^8,R^9) \qquad (IVa)$$

in which
$R^8$ and $R^9$ independently of one another denote $C_1-C_4$-alkyl and
$R^{11}$ represents hydrogen or methyl, or of monomers of the formula (IVa) in their quaternised form of the formula $$[CH_2=CR^{11}-COO-CH_2CH_2-N(R^8,R^9,R^{10})\text{-}$$
$$\oplus Y\ominus \qquad (IVb),$$

in which additionally
$R^{10}$ denotes $C_1-C_4$-alkyl and
Y represents an equivalent of a mono- to tri-valent anion, or of monomers of the formula (IVa) in their N-oxidised form of the formula $$CH_2=CR^{11}-COO-CH_2CH_2-N(R^8,R^9), \qquad (IVc)$$
$$\phantom{CH_2=CR^{11}-COO-CH_2CH_2-N(R^8,R^9),}\downarrow$$
$$\phantom{CH_2=CR^{11}-COO-CH_2CH_2-N(R^8,R^9),}O$$

and also characterised in that the monomers (IIa) and/or (IIb) can be completely or partially replaced by one or more monomers of the group consisting of styrene, acrylonitrile, vinyl acetate, vinyl propionate and methyl methacrylate.

Preferably, up to 50 relative % by weight of the monomers (IIa) and/or (IIb) can be replaced by one or more monomers of the group consisting of styrene, acrylonitrile, vinyl acetate, vinyl propionate and methyl methacrylate.

Preferentially, in the case of monomers of the formula (I) n assumes values of 6 to 10 and additionally preferentially m assumes the value 2. Even more preferentially, $R^1$ in monomers of the formula (I) denotes hydrogen.

Preferentially, in monomers of the formula (IIa) $R^4$ denotes methyl, ethyl, propyl, butyl, hexyl or octyl.

Preferentially, in monomers of the formula (III) $R^6$ denotes hydrogen and the index p denotes a number from 3 to 25. In this case, it is surprising that, as a result of incorporation of the monomers of the formula (III) in which $R^6$ denotes hydrogen and the index p denotes a number from 5 to 9, outstanding results are obtained in textile finishing.

Preferentially, in monomers of the formula (IVa, b and c) $R^8$ and $R^9$ denote methyl. Preferred anions are chloride, acetate, sulphate, aryl- or alkylsulphonate or phosphate. Chloride and acetate are particularly preferred.

Preferentially, the copolymers contain the monomers copolymerised in the following weight ratios:
50 to 70% of those of the formula (I),
10 to 44% of those of the formula (IIa) and/or (IIb),
5 to 25% of those of the formula (III) and
1 to 10% of those of the formula (IVa) or (IVb) or (IVc),
whereby the monomers of the formulae (IIa) and/or (IIb) can be replaced completely or partially by one or more monomers of the group comprising styrene, acrylonitrile, vinyl acetate, vinyl propionate and methyl methacrylate.

The copolymers are prepared by polymerisation of the monomers (1), (II), (III) and (IVa, b or c) in solution. Solvents which can be employed are ethyl acetate, butyl acetate, acetone, methyl ethyl ketone, methyl isobutyl ketone, ethanol, isopropanol and tert-butanol. Acetone is preferred. The polymerisation can in this case be carried out discontinuously or continuously. In the case of the discontinuous procedure, the batch and stream addition process may be mentioned.

Initiators employed for the polymerisation are free radical initiators, such as, for example, azo compounds or peroxides. Azoisobutyronitrile, azoisovaleronitrile and tert-butyl perpivalate are preferred.

To regulate the molecular weight, chain-transfer agents such as, for example, dodecylmercaptan can be employed.

The polymerisation temperature is 40° to 100° C., preferably 50° to 90° C.

The polymers can be obtained, if desired, by removal, for example by evaporation, of the solvents.

Aqueous dispersions of the copolymers according to the invention are prepared by adding water to the solution of the copolymers after their preparation and at least partially removing the solvent by distillation. If the monomer (IVa) is used in the preparation of the copolymers, a neutralizing agent, preferentially hydrochloric acid or acetic acid, is added to the copolymer solution together with the water.

The solvents can be removed, for example, in vacuo at elevated temperature (40°-90° C.). It is basically possible to leave a relatively large part of the solvent present in the dispersions according to the invention. For reasons of occupational safety and occupational hygiene, the solvent, however, is preferably removed by distillation to such an extent that the flash points of the dispersion are above 100° C. The aqueous dispersions are stable after removal of the solvent.

Of course, it is also possible jointly to employ other fluorine-containing copolymers according to the invention, for example those of different fluorine content, for the preparation of the said aqueous dispersions. Thus, for example, two or more dispersions prepared according to the invention can be mixed with various fluorine-containing copolymers according to the invention. However, dispersions of two or more separately prepared, but different fluorine-containing copolymers according to the invention can be dispersed jointly. It is also possible to add one or more fluorine-containing copolymers according to the invention to a dispersion prepared according to the invention, these copolymers being different from one another.

The invention furthermore relates to the use of the aqueous dispersions according to the invention as finishing agents for textile substrates, in particular for the treatment of carpet goods. The chemical nature of the substrates to be treated can be, for example, cellulose, cellulose derivatives, polyester, polyamide and polyacrylonitrile and also wool or silk, to which the dispersions according to the invention impact oleophobic and hydrophobic properties. In this connection, in a manner known to the person skilled in the art, the aqueous dispersions according to the invention can be mixed with further fluorine-containing or fluorine-free dispersions. An example of other dispersions of this type consists in the mixing with aqueous colloidal suspensions of organosiloxanes, which are known, for example, from German Offenlegungsschrift 3,307,420.

The application of the aqueous dispersions according to the invention to the substrates mentioned is carried out by known methods, such as the exhaust, padding, spraying or foam method without subsequent temperature treatment. In a preferred embodiment, the finished substrates are dried at temperatures from 15° to 40' C., preferably at ambient temperature. It is of course also possible to dry them at a higher relatively temperature, for example 150° C. or even higher. However, no further advantages are thereby obtained with respect to the oil- and water-repellency. The desired oleophobic and hydrophobic properties are already obtained at lower application rates compared to finishing agents of the prior art. Leather and mineral substrates, for example stone, can be finished in the same manner.

Likewise, the dispersions according to the invention can be used as paper auxiliary for the oleophobic and hydrophobic finishing of paper. In a manner which is known to a skilled person the dispersions according to the invention can be employed together with further known paper auxiliaries, e.g. starch, agents for retention, wet-fastness and sizing. In comparison with a commercial oil repellent agent (e.g. $[CF_3-(CF_2)_7-SO_2-N(C_2H_5)-C_2H_4-O]_2-P(O)-ONH_4$ with tradename Scotchban FC 807) the inventive dispersions exhibit additionally a good hydrophobic effect and an oleophobic effect also in the presence of hard tap water.

The use of the inventive dispersions takes place according to known processes, e.g. by mass or surface impregnation, preferably by surface impregnation.

EXAMPLE 1

In a reactor with a thermometer, stirrer and reflux condenser, a solution of 62.0 parts by weight of $CH_2=CHCOOCH_2CH_2C_8F_{17}$ 15.0 parts by weight of n-butyl acrylate 20.0 parts by weight of $CH_2=\underset{\underset{CH_3}{|}}{C}COO(CH_2CH_2O)_8H$ 3.0 parts by weight of dimethylaminoethyl methacrylate in 285.0 parts by weight of acetone is prepared.

The solution is initially stirred at room temperature in a nitrogen atmosphere, then mixed with 2.25 parts by weight of tert-butyl perpivalate (75% strength) and kept at 73° C. under autogenous pressure for 8 h. After this time, the polymerisation is complete. The polymer solution is cooled to 50° C., and a solution of 3.9 parts by weight of acetic acid in 296.0 parts by weight of deionised water is added at 50° C. in the course of 15 min. The mixture is stirred for 15 min., and the acetone is then removed by distillation at 60° C./200–300 mbar. A stable polymer dispersion having a solids content of 25.55% by weight and a fluorine content in the solid of 36.4% by weight is obtained. The viscosity, measured at 25° C. with an Ubbelohde viscometer, is 39.5 cSt. The average diameter of the volume distribution $\overline{D}_{AV}$ (according to DIN 53206 of August 1972) is 30.6 nm.

EXAMPLE 2

Use Finishing and Assessment of Carpets

An aqueous dispersion according to Example 1 is prepared. 29 parts by weight of this dispersion are mixed with 60 parts by weight of an aqueous colloidal suspension of organosiloxanes, as are described in DE 3,307,420, and 11 parts by weight of deionised water.

A 1.0% strength aqueous dilution of this mixture is applied (spray application) to a polyamide carpet (Tuftingware, pile weight 500 g/m²) so that a coating of 1.0% by weight of the abovementioned mixture (relative to the pile weight) remains on the carpet.

Another application method is as follows: A polyamide carpet (Tuftingware, pile weight: 500 g/m²) is impregnated with a 1.0% strength aqueous dilution of this mixture and squeezed off (padding process) so that a coating of 1.0% by weight of the abovementioned mixture (relative to the pile weight) remains on the carpet.

Drying and condensation then takes place at room temperature (25° C. for 24 h) and at 125° to 150° C. for 5 to 15 minutes, conditioning takes place at 23° C. at 55% relative humidity for 24 hours and the application tests are then carried out.

The results of the application tests can be taken from the following table.

| Coating | | Spraying process | | Padding process | |
|---|---|---|---|---|---|
| [% by weight] | Drying [°C.] | Oleophobicity[1] | Hydrophobicity[2] | Oleophobicity[1] | Hydrophobicity[2] |
| 1.0 | 25 | 6 | 20/80 | 6 | 20:80 |
| 1.0 | 125-150 | 5 | 20/80 | 6 | 20:80 |

COMPARISON EXAMPLES 1-2

The monomers given in the following table are copolymerised in the manner given in Example 1. The solids contents obtained are given in the table.

| Monomer [parts by weight] | Comparison Examples | |
|---|---|---|
| | 1 | 2 |
| $CH_2=CHCOOCH_2CH_2C_8F_{17}$ | 60 | 60 |
| $CH_2=C(CH_3)COO(CH_2CH_2O)_8H$ | 35 | — |
| $CH_2=C(CH_3)COO(CH_2CH_2O)_{12}H$ | — | 35 |
| Dimethylaminoethyl methacrylate | 5 | 5 |
| Solids content [% by weight] | 24,67 | 25,02 |

EXAMPLES 3-4

The monomers given in the following table are copolymerised in the manner given in Example 1. The solids contents obtained are given in the table.

| Monomer [parts by weight] | Examples | |
|---|---|---|
| | 1 | 2 |
| $CH_2=CHCOOCH_2CH_2C_8F_{17}$ | 60 | 60 |
| $CH_2=C(CH_3)COO(CH_2CH_2O)_8H$ | 20 | — |
| $CH_2=C(CH_3)COO(CH_2CH_2O)_{12}H$ | — | 20 |
| n-Butyl acrylate | 15 | 15 |
| Dimethylaminoethyl methacrylate | 5 | 5 |
| Solids content [% by weight] | 24,67 | 25,02 |

EXAMPLE 5

Use, finishing and assessment of carpets

A polyamide carpet (Tuftingware, pile weight 500 g/m²) is impregnated with a 0.70% strength aqueous dilution or a 0.35% strength aqueous dilution of the dispersions obtained according to Examples 3 and 4 and Comparison Examples 1 and 2, respectively, and squeezed off (padding process) so that a coating of 0.70% by weight or 0.35% by weight, respectively, of the abovementioned dilutions (relative to the pile weight) remains on the carpet.

Drying then takes place at room temperature (25° C. for 24 h). Conditioning takes place for 24 hours at 23° C. and 65% relative atmospheric humidity and the application tests are then carried out as in Example 2. The results can be taken from the following Table.

| Dispersion | Coating [% by weight] | Drying [°C.] | Oleophobicity | Hydrophobicity |
|---|---|---|---|---|
| Example 3 | 0.70 | 25 | 5 | 20:80 |
| | 0.35 | 25 | 4-5 | 20:80 |
| Example 4 | 0.70 | 25 | 5 | 50:50 |
| | 0.35 | 25 | 4-5 | 50:50 |
| Comparison Example 1 | 0.70 | 25 | 4 | 20:80 |
| | 0.35 | 25 | 3-4 | 20:80 |
| Comparison Example 2 | 0.70 | 25 | 3-4 | 50:50 |
| | 0.35 | 25 | 3 | 50:50 |

Example 3 in comparison to Comparison Example 1 and Example 4 in comparison to Comparison Example 2 show that in the area of hydrophobicity, acceptable values are achieved even with compositions not according to the invention; the value of the oleophobicity falls, however, from desired values 5 to no longer acceptable values 4 or below.

EXAMPLE 6

The monomers given in the following Table are copolymerised in the manner given in Example 1.

| Monomer | Parts by weight |
|---|---|
| $CH_2=CHCOOCH_2CH_2C_8F_{17}$ | 70 |
| $CH_2=C(CH_3)COO(CH_2CH_2O)_8H$ | 20 |
| Styrene | 4.2 |
| Acrylonitrile | 2.8 |
| Dimethylaminoethyl methacrylate | 3.0 |
| Solids content [% by weight] | 24.63 |
| Fluorine content in the solid [% by weight] | 41.1 |
| Viscosity [cSt/°C.] | 46.2/25 |

The dispersion prepared according to Example 6 is suitable for the oleophobic and hydrophobic finishing of textiles, for example table linen and protective work clothing, and imparts a very good dirt removability to the finished textiles.

EXAMPLE 7

This Example shows the good applicability of the novel auxiliaries for the oleophobic and hydrophobic finishing of paper.

According to Example 1 the monomers listed in the following table are transformed into an aqueous dispersion.

| Monomers | % b.w. |
|---|---|
| $CH_2=CH-COO-CH_2CH_2-C_8F_{17}$ | 73 |
| $CH_2=C(CH_3)-COO-(CH_2CH_2O)_8H$ | 15 |
| methyl methacrylate | 9 |
| dimethylaminoethyl methacrylate | 3 |
| solids content [% b.w.] | 24.45 |
| fluorine content in the solid [% b.w.] | 42.4 |
| viscosity [cSt/°C.] | 23.3./25 |

The following kind of paper was used:
50 parts of bleached cellulose of conifers,
50 parts of bleached cellulose of leaved trees,
10% of clay ash,
grade of grinding: 35° SR,
pH-value: 7.2,
specific mass: 80 g/m².

The finishing of the papers was carried out on a laboratory sizing press (Type HF of Mathis Comp., Zürich/Switzerland). A certain amount of the auxiliary to be examined as listed up in the following table in deionized water and in tap water of 17° German Hardness (G.H.), respectively, was used as impregnating liquor. The wet absorption was about 80%. Drying was carried out in a drying cylinder at 90° C. for 1 min. Then the papers were conditioned at room temperature for 2 h.

Judgment of hydrophobia: Take-up of water according to the Cobb method (DIN 53 132) at a testing time of 60 sec. was determined.

Judgment of oleophobia: The TAPPI test 454 ts-66 was carried out.

The hydrophobic and oleophobic effects of the inventive auxiliary are listed up in the following table. In comparison with a commercial oleophobic agent there are remarkable advantages in the oleophobic efficiency especially in the presence of hard tap water.

TABLE to Example 7

| Agent | Solids (% b.w.) | Dilution Water | Water Take-up (g/m²), Cobb 60 | TAPPI Test 454 ts-66 (min) |
|---|---|---|---|---|
| Expl. 7 | 0.25 | Tap Water (17° G.H.) | 58 | >30 |
|  | 0.50 | Deionized Water | 24 | >30 |
| Scotchban FC 807 (33%) | 0.25 | Tap Water (17° G.H.) | >80 | 2 |
|  | 0.50 | Deionized Water | >80 | >30 |

What is claimed is:

1. Fluorine-containing copolymers and aqueous dispersions prepared therefrom containing 5 to 50% by weight relative to the total weight of the dispersions, of ingredients other than water (solid content), wherein the copolymers contain copolymerized comonomers in the following percentages by weight, relative to the total weight of the copolymers:

a) 45–75% by weight of (meth)acrylates containing perfluoroalkyl groups, of the formula $$C_nF_{2n+1}-X-OCO-CR^1=CH_2 \quad (I)$$

in which
n represents a number from 4–12,
$R^1$ denotes hydrogen or methyl and
X represents $-(-CH_2-)_m-$, $-SO_2-NR^2-CH_2-CHR^3$ or $-O-(-CH_2-)_m-$, where m denotes a number from 1 to 4, $R^2$ represents $C_1-C_4$-alkyl and $R^3$ represents hydrogen or methyl, b) 10 to 50% of monomers of the formulae $$CH_2=CH-CO-OR^4 \quad (IIa)$$

and/or $$CH_2=C(CH_3)-CO-OR^{12} \quad (IIb),$$

in which
$R^4$ represents a $C_1-C_{22}$-alkyl radical and
$R^{12}$ denotes $C_2-C_{22}$-alkyl
wherein the monomers (IIa) and/or (IIb) can be completely or partially replaced by one or more monomers of the group consisting of styrene, acrylonitrile, vinyl acetate, vinyl propionate and methyl methacrylate, c) 4–30% of monomers of the formula $$CH_2=CR^5-COO(-CH-CH_2O-)_pR^7 \quad (III)$$
$$\phantom{CH_2=CR^5-COO(-}|$$
$$\phantom{CH_2=CR^5-COO(-}R^6$$

$R^5$ and $R^6$ independently represent hydrogen or methyl and
$R^7$ denotes hydrogen or $C_1-C_8$-alkyl and
p represents a number from 1 to 50, and d) 1 to 15% of monomers of the formula $$CH_2=CR^{11}COO-CH_2CH_2-N(R^8,R^9) \quad (IVa)$$

in which $R^8$ and $R^9$ independently of one another denote $C_1$-$C_4$-alkyl and
$R^{11}$ represents hydrogen or methyl,
or of monomers of the formula (IVa) in their quaternised form of the formula $$[CH_2=CR^{11}-COO-CH_2CH_2-N(R^8,R^9,R^{10})]^{\oplus} Y^{\ominus} \quad (IVb),$$

in which additionally
$R^{10}$ denotes $C_1$-$C_4$-alkyl and
Y represents an equivalent of a mono- to tri-valent anion,
or of monomers of the formula (IVa) in their N-oxidised form of the formula $$CH_2=CR^{11}-COO-CH_2CH_2-\underset{\underset{O}{\downarrow}}{N}(R^8,R^9). \quad (IVc)$$

2. The aqueous dispersions of claim 1, containing 10 to 40% by weight of solid content, relative to the total weight of the dispersions.

3. The aqueous dispersions of claim 1, wherein the index n represents a number from 6-10.

4. Copolymers and aqueous dispersions prepared therefrom according to claim 1, wherein the percentage by weight of the groups of the comonomers assume the following values:

a) 50-70%
b) 10-44%
c) 5-25% and
d) 1-10%, whereby the monomers of b) can be replaced completely or partially by one or more monomers of the group comprising styrene, acrylonitrile, vinyl acetate, vinyl propionate and methyl methacrylate.

5. Copolymers and aqueous dispersions prepared therefrom of claim 1, wherein, in the case of the monomers of the formula (I), n assumes values from 6 to 10, independently thereof m assumes a value of 2 and furthermore independently thereof $R^1$ denotes hydrogen.

6. Copolymers and aqueous dispersions prepared therefrom according to claim 1, characterised in that, in the case of monomers of the formula (IIa), $R^4$ denotes methyl, ethyl, propyl, butyl, hexyl or octyl.

7. Copolymers and aqueous dispersions prepared therefrom according to claim 1, wherein, in the case of monomers of the formula (III), $R^6$ denotes hydrogen and, independently thereof, the index p represents a number from 3 to 25.

8. Copolymers and aqueous dispersions prepared therefrom of claim 1, wherein, in the case of monomers of the formula (IVa), (IVb) or (IVc), the radicals $R^8$ and $R^9$ are identical and denote methyl and, independently thereof, $Y^{\ominus}$ is chloride, acetate, ½ sulphate, aryl- or alkyl-sulphonate or ⅓ phosphate.

9. Copolymers and aqueous dispersions prepared therefrom of claim 8, wherein $Y^{\ominus}$ is chloride or acetate.

* * * * *